Aug. 9, 1927.  1,638,745
L. G. RANDOLPH
PAN TURNING DEVICE FOR COOKING STOVES
Filed Oct. 17, 1925  2 Sheets-Sheet 2
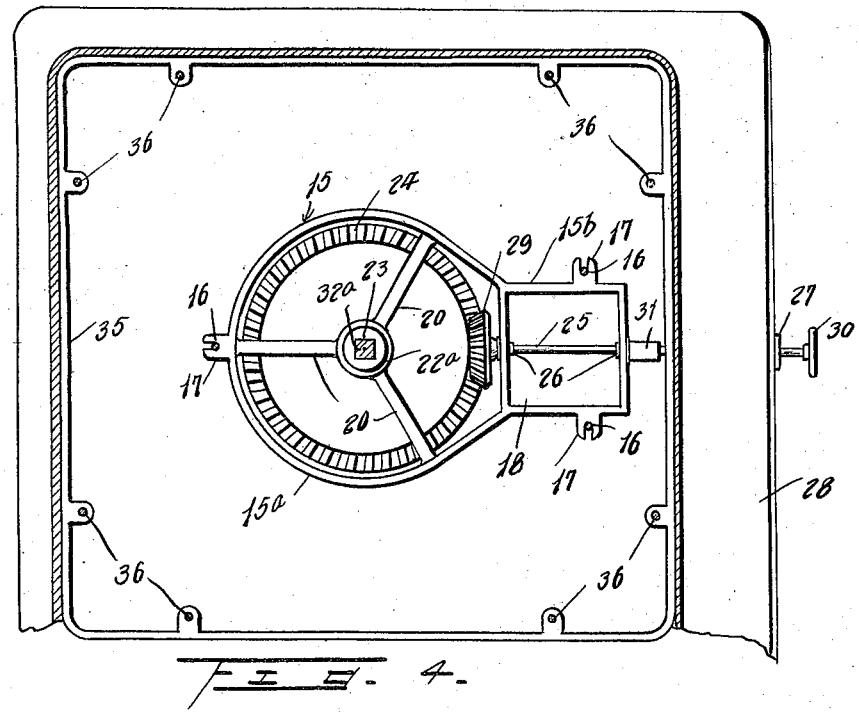
FIG. 4.
FIG. 5.
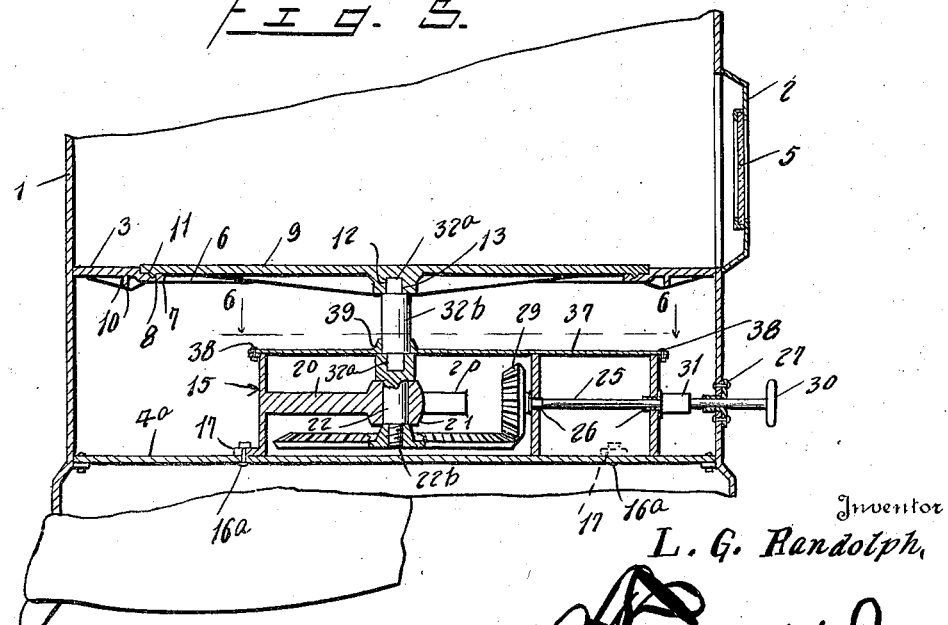
Inventor
L. G. Randolph,
By
Attorney Patented Aug. 9, 1927.

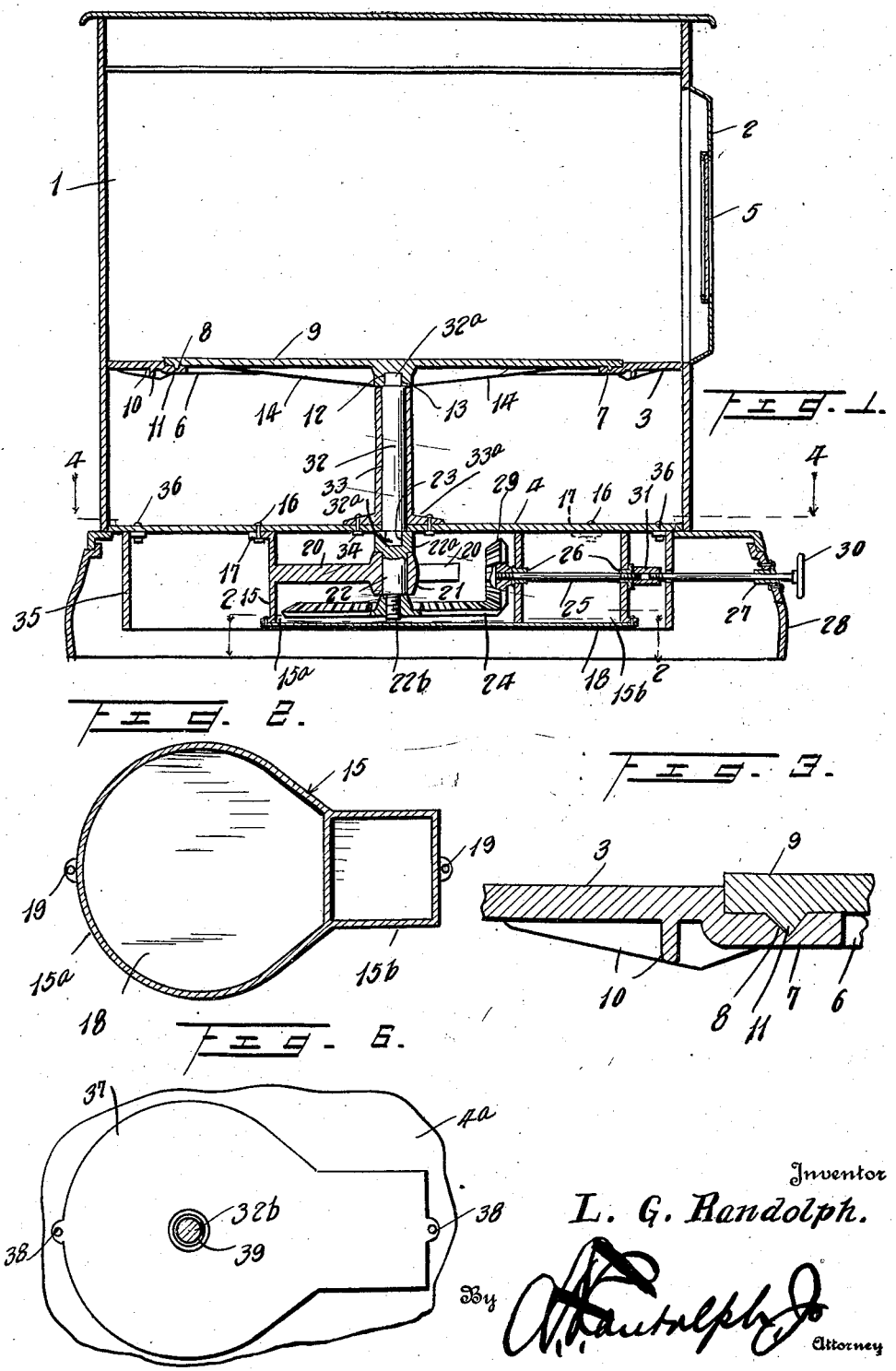

1,638,745

UNITED STATES PATENT OFFICE.

LLOYD G. RANDOLPH, OF BIG RUN, PENNSYLVANIA.

PAN-TURNING DEVICE FOR COOKING STOVES.

Application filed October 17, 1925. Serial No. 63,058.

This invention relates to cooking stoves, and has for one of its objects the provision of a novel, simple and highly efficient device through the medium of which a pan in which an article is being baked may, without opening the oven door, be readily turned from time to time as conditions require so as to effect the thorough and uniform cooking of the article.

With the foregoing and other objects in view, the invention consists of the novel construction, combination and arrangement of parts hereinafter fully described and claimed, and illustrated in the accompanying drawings, wherein:

Figure 1 is a transverse sectional view of a cooking stove embodying my invention, Figure 2 is a detail sectional view taken on the horizontal plane indicated by the line 2—2 of Figure 1, Figure 3 is a detail sectional view illustrating the manner in which the pan support or rotor of the device is supported by the bottom of the oven, Figure 4 is a sectional view taken on the horizontal planes indicated by the line 4—4 of Figure 1, Figure 5 is a view similar to Figure 1 illustrating a slightly modified form of the device, and Figure 6 is a detail sectional view taken on the horizontal plane indicated by the line 6—6 of Figure 5.

Corresponding and like parts are referred to in the following description, and designated in the several views of the accompanying drawings, by similar reference characters.

In the drawings, 1 designates the oven and 2 the oven door of a cooking stove. The bottom of the oven and the bottom of the stove are designated 3 and 4, respectively. The oven door 2 is provided with a transparent panel 5 which permits the article being cooked to be observed without opening the door. The oven bottom 3 is provided with a circular opening 6 and a downwardly offset flange 7. The part 7 is of annular formation and extends inwardly from the wall of the opening 6. It is provided in its upper side with an annular groove 8 of V or other suitable formation in cross section, and constitutes a support for a rotatable pan carrying plate or rotor 9. The oven bottom 3 and flange 7 and the point of connection between these parts, are reinforced and strengthened by ribs 10. The rotor 9 extends above the top side of the oven bottom 3 to support a pan out of contact with the oven bottom and thereby permit the free movement of the rotor and prevent any possibility of the displacement of the pan. The rotor 9 is provided at its under side with an annular rib 11 which has a snug fit in the groove 8 and functions to prevent soot from entering the oven 1. A boss 12 depends centrally from the under side of the rotor 9, and is provided with a polygonal socket 13. This part and the rotor 9 are reinforced and strengthened by ribs 14.

A gear case 15 is secured against the under side of the stove bottom 4 by bolts 16, and is provided with slotted lugs 17 for the reception of said bolts. The gear case 15 comprises a substantially cylindrical portion 15$^a$ and a rectangular portion 15$^b$, and is closed at its under side by a plate 18 removably secured in place by bolts 19. The portion 15$^a$ of the gear case 15 is provided with radial arms 20 which support a bearing 21 centrally within said portion of the gear case. A spindle 22 is mounted in the bearing 21, and is provided at its upper end with a head 22$^a$ and at its lower end with a threaded stem 22$^b$. The head 22$^a$ rests upon the bearing 21 and is provided with a polygonal socket 23. A bevel gear wheel 24 is connected to the spindle 22 through the medium of the stem 22$^b$. A shaft 25 is journaled in bearings 26 carried by the portion 15$^b$ of the gear case 15 and a bearing 27 carried by the base 28 of the stove. This shaft is provided at its inner end with a beveled pinion 29 which meshes with the beveled gear wheel 24. It is provided at its outer end with a hand wheel 30, and is of sectional formation, the sections thereof being connected by a coupling 31. A stem 32 which is provided with reduced polygonal ends 32$^a$ fitting in the sockets 13 and 23, establishes a driving connection between the spindle 22 and rotor 9. A sleeve 33 which surrounds the stem 32 and contacts at its ends with the oven bottom 4 and boss 12, and which is provided with a broad base 33$^a$ resting on the oven bottom, is adapted to prevent soot entering the gear case 15 through the opening in the oven bottom through which the stem extends. The sleeve 33 is secured in place by bolts 34 which engage the base 33$^a$ and the stove bottom 4. A frame 35 is secured against the under side of the stove bottom 4 about the gear case 15 by means of bolts 36 and functions to protect said gear case while moving the stove.

In Figure 5 the device is shown applied to a slightly different form of stove. In this application of the device, the gear case 15 is secured to the upper side of the stove bottom 4ª by bolts 16ª, a short stem 32ᵇ is employed to establish a driving connection between the spindle 22 and the rotor 9, and the sleeve 33 is omitted. The frame 35 is also omitted, and the upper side of the gear case 15 is closed by a plate 37 removably secured in place by bolts 38. To prevent soot entering the gear case 15 through the opening in the plate 37 through which the stem 32ᵇ passes, a boss 39 is provided. This part has a snug fit with the stem 32ᵇ and has a downwardly and outwardly inclined outer surface.

In practice, the pan containing the article to be baked is placed on the rotor 9. As the article may be observed through the panel 5 and the rotor 9 and through the medium of the hand wheel 30, the oven door 2 does not have to be again opened until the cooked article is to be removed from the oven. When it is desired to turn the article it is only necessary to grasp and rotate the hand wheel 30, and this may as stated be done without opening the oven door 2. The consequent rotation of the shaft 25 will turn the rotor 9. As the drive pinion 29 is considerably smaller than the driven gear wheel 24, the rotor 9 can only be turned at a slow rate, and as the result there is no possibility of displacing the pan from the rotor or splashing the contents of the pan over the sides thereof.

It should be understood that the drawings are merely illustrative and do not pretend to give exact proportions. Furthermore, the said drawings are illustrative of a preferred construction, it being my expectation that various changes and modifications may be made without departing from the spirit and scope of my invention.

What is claimed is:—

1. In combination, a cooking stove having an oven bottom provided with an opening and a downwardly offset flange extending into said opening, said flange being provided in its upper side with an annular groove, a rotor supported by said flange and provided with an annular rib entering said groove to prevent soot entering the oven, and means operable externally of the oven for turning the rotor.

2. In combination, a cooking stove, a rotor supported within the oven of the stove, a case supported by the bottom of the stove and embodying cylindrical and rectangular portions, radial arms located within and secured to the cylindrical portion of the casing intermediate the upper and lower sides thereof and provided with a central bearing, a spindle journaled in the bearing and provided at its upper end with a socketed head resting upon the bearing, a gear wheel secured to the lower end of the spindle and contacting with the lower end of the bearing, a stem connected to the rotor and having its lower end positioned in the socket of the spindle head, bearings carried by the rectangular portion of the case, a sectional shaft journaled in said bearings, a coupling detachably connecting the shaft sections, and a pinion fixed to the shaft and meshing with the gear wheel, the socket of the spindle head and the lower end of the stem being polygonal.

In testimony whereof I affix my signature.

LLOYD G. RANDOLPH.